(12) United States Patent  
Kusakata

(10) Patent No.: US 12,366,712 B2  
(45) Date of Patent: Jul. 22, 2025

(54) FERRULE FOR OPTICAL CONNECTOR AND OPTICAL CONNECTOR

(71) Applicant: Fujikura Ltd., Tokyo (JP)

(72) Inventor: Ken Kusakata, Sakura (JP)

(73) Assignee: Fujikura Ltd., Tokyo (JP)

( * ) Notice: Subject to any disclaimer, the term of this patent is extended or adjusted under 35 U.S.C. 154(b) by 297 days.

(21) Appl. No.: 18/018,037

(22) PCT Filed: Jul. 14, 2021

(86) PCT No.: PCT/JP2021/026497  
§ 371 (c)(1),  
(2) Date: Jan. 25, 2023

(87) PCT Pub. No.: WO2022/113418  
PCT Pub. Date: Jun. 2, 2022

(65) Prior Publication Data  
US 2023/0273375 A1 Aug. 31, 2023

(30) Foreign Application Priority Data  
Nov. 24, 2020 (JP) .................................. 2020-194493

(51) Int. Cl.  
*G02B 6/36* (2006.01)  
*G02B 6/38* (2006.01)  
*G02B 6/40* (2006.01)

(52) U.S. Cl.  
CPC ........... *G02B 6/3882* (2013.01); *G02B 6/403* (2013.01)

(58) Field of Classification Search  
CPC .... G02B 6/3882; G02B 6/403; G02B 6/3885; G02B 6/36  
See application file for complete search history.

(56) References Cited

U.S. PATENT DOCUMENTS 6,481,900 B1 11/2002 Maeno et al.  
9,632,258 B2 * 4/2017 Nishimura ........... G02B 6/3834  
(Continued)

FOREIGN PATENT DOCUMENTS

CN 206601505 U 10/2017  
EP 1061390 A1 12/2000  
(Continued)

OTHER PUBLICATIONS

International Search Report issued in corresponding International Application No. PCT/JP2021/026497 mailed Oct. 12, 2021 (3 pages).

(Continued)

*Primary Examiner* — Jennifer Doan  
(74) *Attorney, Agent, or Firm* — Osha Bergman Watanabe & Burton LLP

(57) ABSTRACT

A ferrule for an optical connector includes: a ferrule main body that includes fiber holes that extend in a front-rear direction, that are disposed in a left-right direction, and into which optical fibers are inserted, a guide hole into which a guide pin is inserted, and a recessed portion recessed from a rear end surface of the ferrule main body toward a front side on which a connection end surface of the ferrule main body is disposed in the front-rear direction. A vertical direction is perpendicular to both the front-rear direction and the left-right direction. Rear end portions of the fiber holes open at a bottom surface of the recessed portion. The bottom surface includes a first inclined surface inclined toward the fiber holes in a direction toward the front side.

4 Claims, 2 Drawing Sheets

(56) References Cited

U.S. PATENT DOCUMENTS

| | | | |
|---|---|---|---|
| 10,901,155 B2 | 1/2021 | Lu | |
| 2004/0161205 A1* | 8/2004 | Hengelmolen | G02B 6/3834 385/78 |
| 2011/0044589 A1 | 2/2011 | Takaoka et al. | |

FOREIGN PATENT DOCUMENTS

| | | |
|---|---|---|
| JP | S63-080510 U | 5/1988 |
| JP | H04-314008 A | 11/1992 |
| JP | H11-109161 A | 4/1999 |
| JP | 2000-111761 A | 4/2000 |
| JP | 2001-004872 A | 1/2001 |
| JP | 2001-324650 A | 11/2001 |
| JP | 2004-086069 A | 3/2004 |
| JP | 2004-219797 A | 8/2004 |
| JP | 2007-212600 A | 8/2007 |
| JP | 2009157143 A * | 7/2009 |
| JP | 2015-179267 A | 10/2015 |
| JP | 2017-191211 A | 10/2017 |
| WO | 2012/108324 A1 | 8/2012 |

OTHER PUBLICATIONS

International Search Report issued in related International Application No. PCT/JP2021/026732 mailed Oct. 12, 2021 (3 pages).

* cited by examiner

FERRULE FOR OPTICAL CONNECTOR AND OPTICAL CONNECTOR

TECHNICAL FIELD

The present invention relates to a ferrule for an optical connector and an optical connector.

Priority is claimed on Japanese Patent Application No. 2020-194493 filed on Nov. 24, 2020, the content of which is incorporated herein by reference.

BACKGROUND

Patent Document 1 discloses a ferrule for an optical connector. In the ferrule, fiber holes, guide holes, and an adhesive injection window are formed. Optical fibers are inserted into the fiber holes, and a guide pins are inserted into the guide holes. The adhesive injection window is formed in an upper surface or a lower surface of the ferrule. The adhesive injection window is used to inject an adhesive for fixing the optical fibers into the ferrule.

PATENT LITERATURE

[Patent Document 1]
Japanese Unexamined Patent Application, First Publication No. 2001-4872

In order to connect more optical fibers within a limited space, a ferrule is required to be miniaturized. As a result of intensive studies by the inventors of the present application, it has been found that, when a ferrule is miniaturized, from the perspective of a strength, it is difficult to employ a basic structure of a conventional ferrule in which an adhesive injection window is formed on an upper surface or a lower surface.

SUMMARY

One or more embodiments of the present invention provide a ferrule for an optical connector or an optical connector in which miniaturization and a strength are achieved at the same time.

A ferrule for an optical connector according to one or more embodiments of the present invention includes a ferrule main body in which a plurality of fiber holes into which optical fibers are inserted are formed, in which when a direction in which the plurality of fiber holes extend is defined as a front-rear direction, a direction in which the plurality of fiber holes are arranged is defined as a left-right direction, a direction perpendicular to both the front-rear direction and the left-right direction is defined as a vertical direction, a side on which a connection end surface of the ferrule main body is positioned in the front-rear direction is defined as a front side, and a side opposite to the front side is defined as a rear side, the ferrule main body includes a guide hole into which a guide pin is inserted, and a recessed portion recessed toward the front side from a rear end surface of the ferrule main body, rear end portions of the plurality of fiber holes open at a bottom surface of the recessed portion, a first inclined surface inclined toward the plurality of fiber holes in a direction toward the front side is formed on the bottom surface, a thickness Tf of the ferrule main body in the vertical direction and a diameter D of the guide hole satisfy D/Tf>0.4, and an upper surface and a lower surface of the ferrule main body are all covered with a wall surface.

According to the above-described embodiments, the upper surface and the lower surface of the ferrule main body are all covered with a wall surface. Thereby, compared to a case in which an adhesive injection window is formed in the upper surface or the lower surface of the ferrule main body, a strength can be secured even if a thickness of the ferrule main body is small. An adhesive for fixing the optical fibers to the ferrule main body can be injected into the ferrule main body from an opening on the rear side of the recessed portion. Also, when D/Tf>0.4 is satisfied, the ferrule main body can be made thin and miniaturized while securing a positioning accuracy between the optical connectors by making the guide pin inserted into the guide hole thick to a certain extent. Further, since the first inclined surface is formed on the bottom surface of the recessed portion, workability when the optical fibers are inserted into the fiber holes from the rear side can be secured. As described above, it is possible to provide a ferrule for an optical connector in which miniaturization and a strength are achieved at the same time.

Here, a second inclined surface inclined toward the plurality of fiber holes in a direction toward the front side may be formed on the bottom surface, and the first inclined surface and the second inclined surface may be disposed to sandwich the plurality of fiber holes therebetween in the vertical direction and extend in the left-right direction to overlap a region in which the plurality of fiber holes are formed in the left-right direction.

Also, a plurality of inclined surfaces, including the first inclined surface, inclined toward the plurality of fiber holes in a direction toward the front side may be formed on the bottom surface, and the plurality of inclined surfaces may each have a conical shape with an inner diameter decreasing in a direction toward the front side and be formed at the rear end portions of the plurality of fiber holes.

An optical connector according to one or more embodiments of the present invention includes the ferrule for an optical fiber described above, and a fiber ribbon including a plurality of optical fibers aligned in the left-right direction and bundled, in which a thickness Tc of the fiber ribbon in the vertical direction and a dimension L of an internal space of the recessed portion in the vertical direction satisfy $1<L/Tc<2$.

According to the above-described embodiments of the present invention, it is possible to provide a ferrule for an optical connector or an optical connector in which miniaturization and a strength are achieved at the same time.

DETAILED DESCRIPTION

Hereinafter, a ferrule for an optical connector and an optical connector according to one or more embodiments will be described on the basis of the drawings.

Figure 1:
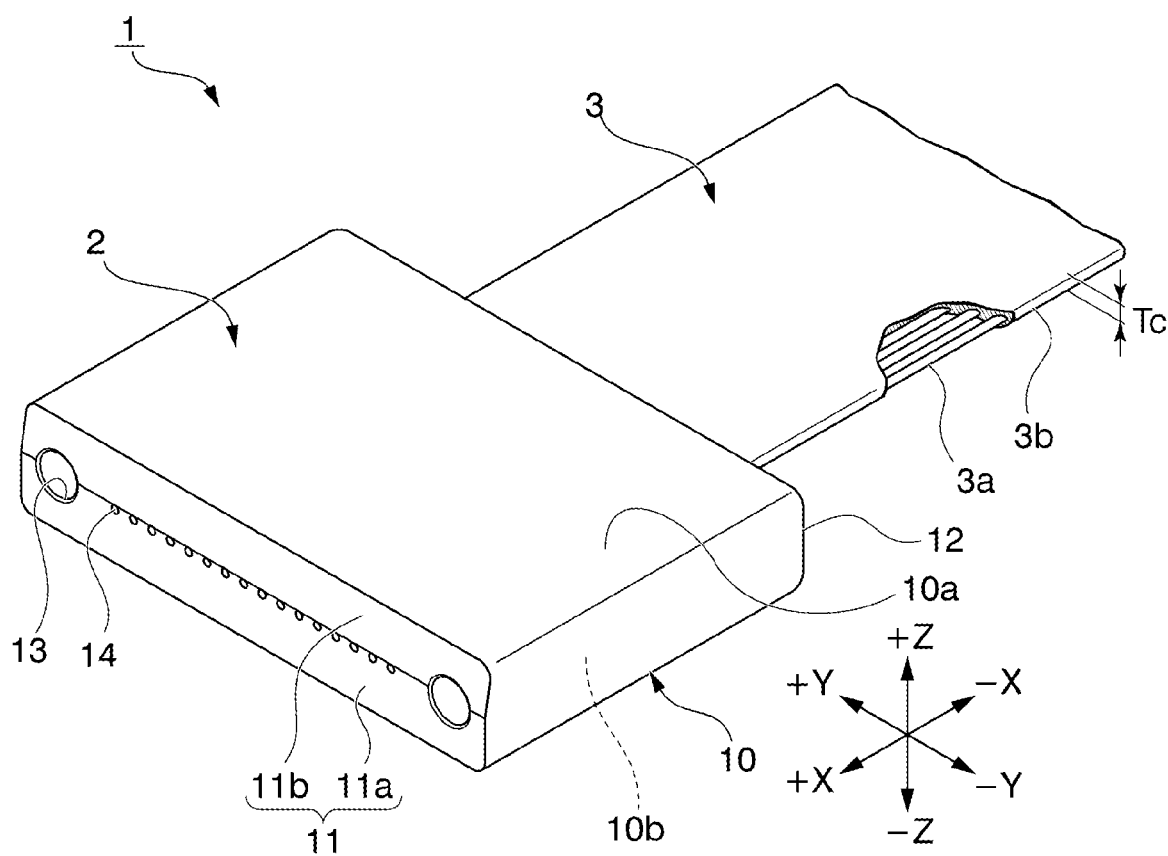
FIG. 1 is a perspective view of an optical connector according to one or more embodiments.

As illustrated in FIG. 1, an optical connector 1 includes a ferrule 2 (ferrule for an optical connector) and a fiber ribbon 3. The fiber ribbon 3 includes a plurality of bundled optical fibers 3a. The fiber ribbon 3 illustrated in FIG. 1 is of a so-called batch coating-type in which the plurality of optical fibers 3a are integrally coated with an outer jacket 3b. However, the fiber ribbon 3 may be of a so-called intermittently bonded-type in which the plurality of optical fibers 3a are intermittently bonded to be fixed. Alternatively, other types of the fiber ribbon 3 may be used as long as the plurality of optical fibers 3a are bundled.

The ferrule 2 includes a ferrule main body 10 in which a plurality of fiber holes 14 into which the optical fibers 3a are inserted are formed. Further, the ferrule 2 may include a portion other than the ferrule main body 10. The ferrule main body 10 has a connection end surface 11 at which the fiber holes 14 open.

(Definition of Directions)

In the present specification, a direction in which the plurality of fiber holes 14 extend is referred to as a front-rear direction X, and a direction in which the plurality of fiber holes 14 are arranged is referred to as a left-right direction Y. A direction perpendicular to both the front-rear direction X and the left-right direction Y is referred to as a vertical direction Z. In the front-rear direction X, a side (+X side) on which the connection end surface 11 of the ferrule main body 10 is positioned is referred to as a front side or a distal end side. A side (−X side) opposite to the distal end side is referred to as a rear side or a base end side. One side (+Z side) in the vertical direction Z is referred to as an upper side. A side (−Z side) opposite to the upper side is referred to as a lower side. One side (+Y side) in the left-right direction Y is referred to as a left side. A side (−Y side) opposite to the left side is referred to as a right side.

Figure 2:
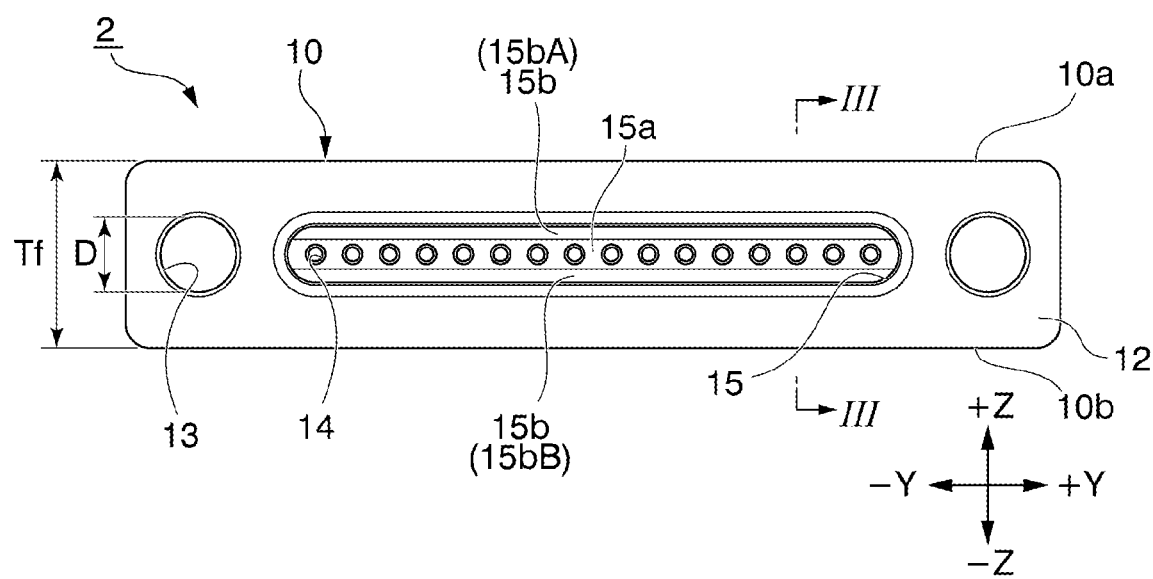
FIG. 2 is a view of a ferrule for the optical connector illustrated in FIG. 1 from a rear side.

As illustrated in FIGS. 1 and 2, the ferrule main body 10 includes the connection end surface 11 which is an end surface on the front side, a rear end surface 12, two guide holes 13, the plurality of fiber holes 14, and a recessed portion 15. The connection end surface 11 has a reference region 11a in the vertical direction Z and an inclined region 11b inclined with respect to the reference region 11a. The inclined region 11b prevents an influence due to return light of light emitted from the optical fibers 3a. The inclined region 11b is inclined toward the rear side as it goes upward.

The two guide holes 13 are disposed to sandwich the plurality of fiber holes 14 therebetween in the left-right direction Y. The guide holes 13 each extend in the front-rear direction X and penetrate the ferrule main body 10. As illustrated in FIGS. 1 and 2, a front end portion of the guide hole 13 opens at the connection end surface 11, and a rear end portion of the guide hole 13 opens at the rear end surface 12. A guide pin (not illustrated) is inserted into the guide hole 13. In the optical connector 1 on a male side, the guide pin is fixed to the ferrule main body 10 while being inserted into the guide hole 13. A method of fixing may be changed as appropriate. For example, an adhesive or the like may be used as a method of the fixing. The guide pin of the optical connector 1 on a male side is inserted into the guide hole 13 of the optical connector 1 on a female side. Thereby, positioning of the two optical connectors 1 is achieved. Also, the optical fibers 3a are exposed at the connection end surface 11 of the ferrule main body 10. Therefore, when the optical connectors 1 are connected to each other, the optical fibers 3a are optically connected to each other.

As illustrated in FIG. 2, in the present specification, a diameter of the guide hole 13 is expressed as D, and a thickness of the ferrule main body 10 in the vertical direction Z is expressed as Tf. In order to secure a positioning accuracy between the optical connectors 1 due to the guide pin, the diameter D of the guide hole 13 is required to be increased to a certain extent. This is because a diameter (thickness) of the guide pin and the diameter D of the guide hole 13 are substantially the same, and the positioning accuracy becomes more stable as the guide pin becomes thicker. Also, in order to connect more optical fibers 3a within a limited space, the thickness Tf of the ferrule main body 10 is required to be reduced. As a result of intensive studies by the inventors of the present application, it has been found that it is possible to meet the above-described requirements by determining dimensions of the ferrule main body 10 to satisfy D/Tf>0.4.

Figure 3:
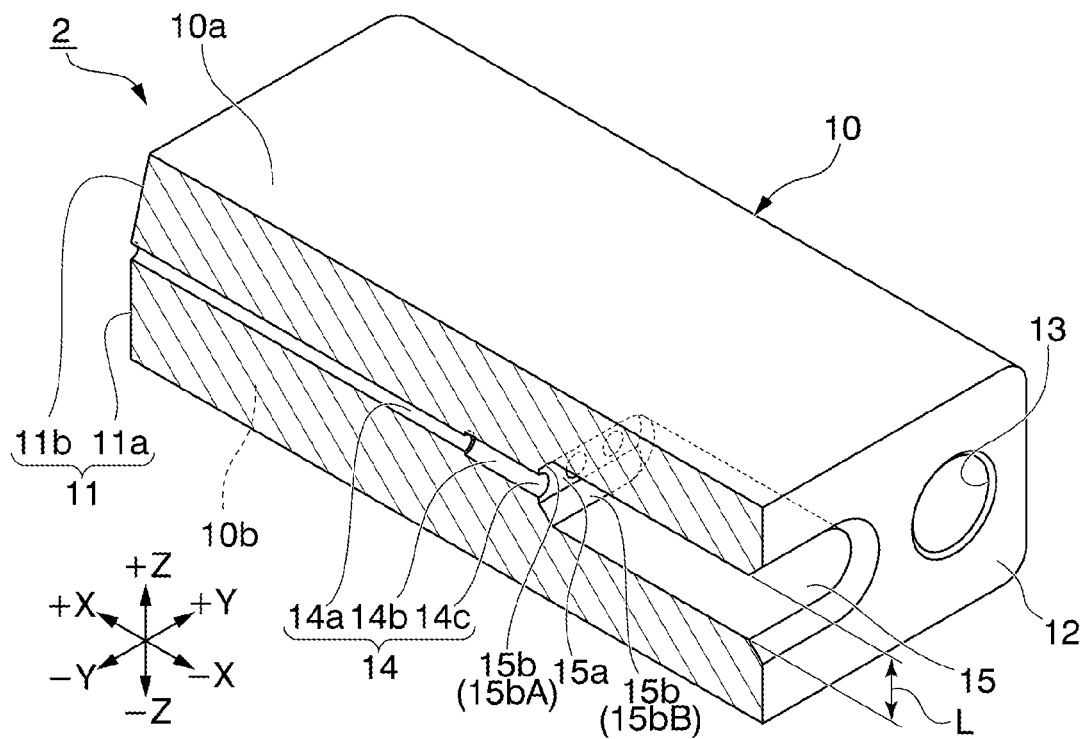
FIG. 3 is a partial cross-sectional view along line III-III of the ferrule for the optical connector illustrated in FIG. 2.

As illustrated in FIG. 3, the fiber holes 14 each include a small diameter portion 14a and an enlarged diameter portion 14b. The enlarged diameter portion 14b has a larger inner diameter than the small diameter portion 14a. The enlarged diameter portion 14b is positioned on a rear side with respect to the small diameter portion 14a. A portion of a glass part of the optical fiber 3a is inserted into the small diameter portion 14a. A portion of a coating layer covering the glass part is inserted into the enlarged diameter portion 14b. Further, the fiber hole 14 may not have the small diameter portion 14a and the enlarged diameter portion 14b, and may have a constant inner diameter over the entire length.

As illustrated in FIGS. 2 and 3, the recessed portion 15 is recessed toward the front side from the rear end surface 12. When viewed from the rear side, an internal space of the recessed portion 15 has a horizontally-long flat shape. That is, a dimension of the internal space of the recessed portion 15 in the left-right direction Y is larger than a dimension thereof in the vertical direction Z. A rear end portion 14c of each fiber hole 14 opens at a bottom surface 15a (a surface facing the rear side) of the recessed portion 15.

Two inclined surfaces 15b (a first inclined surface 15bA and a second inclined surface 15bB) are formed on the bottom surface 15a. The inclined surfaces 15bA and 15bB are each inclined toward the fiber holes 14 in a direction toward the front side. The first inclined surface 15bA and the second inclined surface 15bB are disposed to sandwich the plurality of fiber holes 14 therebetween in the vertical direction Z. The first inclined surface 15bA and the second inclined surface 15bB extend in the left-right direction Y to overlap a region in which the plurality of fiber holes 14 are formed in the left-right direction Y. The first inclined surface 15bA is positioned above the second inclined surface 15bB. The first inclined surface 15bA is inclined downward in a direction toward the front side. The second inclined surface 15bB is inclined upward in a direction toward the front side.

Although not illustrated, the outer jacket 3b is removed at a front end portion of the fiber ribbon 3 and the optical fibers 3a are exposed. The front end portion of the fiber ribbon 3 is inserted into the recessed portion 15, and the optical fibers 3a are respectively inserted into the fiber holes 14. At this time, the inclined surfaces 15bA and 15bB formed in the recessed portion 15 serve the role of guiding the optical fibers 3a toward the fiber holes 14. An adhesive is injected into the recessed portion 15 with the optical fibers 3a inserted into the fiber holes 14. As a method of injecting the adhesive, for example, the adhesive is injected into the recessed portion 15 from a gap between an opening at a rear end of the recessed portion 15 and the fiber ribbon 3 by using a dispenser. When the injected adhesive is cured, the optical fibers 3a and the ferrule main body 10 are fixed.

In this way, in one or more embodiments, the adhesive is injected into the ferrule main body 10 through the opening on the rear side of the recessed portion 15. In a conventional general ferrule for a connector, an adhesive injection window for injecting an adhesive has been formed in an upper surface 10a or a lower surface 10b. In one or more embodiments, the thickness Tf of the ferrule main body 10 is made extremely small (for example, 2 mm or less). Therefore, a strength of the ferrule main body 10 is less likely to be secured if the adhesive injection window is formed in the upper surface 10a or the lower surface 10b as in conventional cases. Therefore, a method of injecting the adhesive from the opening on the rear side of the recessed portion 15 is employed without forming the adhesive injection window in the upper surface 10a and the lower surface 10b of the ferrule main body 10. That is, the recessed portion 15 also functions as an adhesive injection hole.

A front end portion of the outer jacket 3b of the fiber ribbon 3 is inserted into the recessed portion 15. Therefore, not only the optical fibers 3a but also the outer jacket 3b are fixed to the ferrule main body 10 in the recessed portion 15 by the adhesive. As illustrated in FIG. 1, in the present specification, a thickness of the fiber ribbon 3 (thickness of the outer jacket 3b) in the vertical direction Z is expressed as Tc. Also, as illustrated in FIG. 3, a dimension of the internal space of the recessed portion 15 in the vertical direction Z is expressed as L. As a result of intensive studies by the inventors of the present application, when dimensions are set to satisfy $1<L/Tc<2$, a position of the optical fiber 3a in the vertical direction Z is easily aligned with the fiber hole 14, and assembling workability is satisfactory. Also, when $1<L/Tc<1.1$ is satisfied, it may be possible to make the assembling workability more satisfactory. As an example of the dimensions, it is possible to realize the ferrule 2 satisfying $L=0.35$ mm and $Tc=0.32$ mm. In this case, $L/Tc=1.094$.

Also, when the inventors of the present application conducted intensive studies, it was found that the thickness Tf of the ferrule main body 10 in the vertical direction Z and the dimension L of the internal space of the recessed portion 15 may satisfy $L/Tf<0.3$. Further, flange parts protruding to the left and right sides from a ferrule main body have been provided in conventional general ferrules for optical connectors, but such flange parts are not provided in the ferrule 2 of one or more embodiments. By devising as described above, it is possible to reduce a size of the ferrule 2 further.

A fiber groove extending in the front-rear direction X to introduce the optical fiber 3a into the fiber hole 14 is not formed on an inner surface of the recessed portion 15. Even without such a fiber groove, since a gap between the outer jacket 3b of the fiber ribbon 3 and the inner surface of the recessed portion 15 in the left-right direction Y is small, it is possible to align a position of the optical fiber 3a in the left-right direction Y with the fiber hole 14.

As described above, the ferrule 2 of one or more embodiments includes the ferrule main body 10 in which the plurality of fiber holes 14 into which the optical fibers 3a are inserted are formed. When a direction in which the plurality of fiber holes 14 extend is defined as a front-rear direction X, a direction in which the plurality of fiber holes 14 are arranged is defined as a left-right direction Y, a direction perpendicular to both the front-rear direction X and the left-right direction Y is defined as a vertical direction Z, a side on which the connection end surface 11 of the ferrule main body 10 is positioned in the front-rear direction X is defined as a front side, and a side opposite to the front side is defined as a rear side, the ferrule main body 10 includes the guide hole 13 into which a guide pin is inserted, and the recessed portion 15 recessed toward the front side from the rear end surface 12 of the ferrule main body 10. The rear end portions 14c of the plurality of the fiber holes 14 open at the bottom surface 15a of the recessed portion 15, and the first inclined surface 15bA that is inclined toward the plurality of fiber holes 14 in a direction toward the front side is formed on the bottom surface 15a. The thickness Tf of the ferrule main body 10 in the vertical direction Z and the diameter D of the guide hole 13 satisfy $D/Tf>0.4$. The upper surface 10a and the lower surface 10b of the ferrule main body 10 are all covered with a wall surface to maintain a strength of the ferrule main body 10. Further, in one or more embodiments, the upper surface 10a (lower surface 10b) and the wall surface are not different surfaces but the same surface. In other words, an adhesive injection window communicating with an internal space of the recessed portion 15 is not formed in each of the upper surface 10a and the lower surface 10b.

According to the ferrule 2 configured as described above, the upper surface 10a and the lower surface 10b of the ferrule main body 10 are all covered with a wall surface. In other words, a hole penetrating the upper surface 10a is not formed in the upper surface 10a. A hole penetrating the lower surface 10b is not formed in the lower surface 10b. Thereby, compared to a case in which an adhesive injection window is formed in the upper surface 10a or the lower surface 10b of the ferrule main body 10, it is possible to secure a strength even if a thickness of the ferrule main body 10 is small. It is possible to inject an adhesive for fixing the optical fibers 3a to the ferrule main body 10 into the ferrule main body 10 from the opening on the rear side of the recessed portion 15. Also, when $D/Tf>0.4$ is satisfied, it is possible to make the ferrule main body 10 thin and miniaturized while securing a positioning accuracy between the optical connectors 1 by making the guide pin inserted into the guide hole 13 thick to a certain extent. Further, since the first inclined surface 15bA is formed on the bottom surface 15a of the recessed portion 15, it is possible to secure workability when the optical fibers 3a are inserted into the fiber holes 14. As described above, it is possible to provide the ferrule 2 in which miniaturization and a strength are achieved at the same time.

Also, the second inclined surface 15bB that is inclined toward the plurality of fiber holes 14 in a direction toward the front side is formed on the bottom surface 15a. The first inclined surface 15bA and the second inclined surface 15bB are disposed to sandwich the plurality of fiber holes 14 therebetween in the vertical direction Z, and extend in the left-right direction Y to overlap a region in which the plurality of fiber holes 14 are formed in the left-right direction Y. According to this configuration, when the optical fiber 3a is inserted into the fiber hole 14, even if the optical fiber 3a is deviated either upward or downward with respect to the fiber hole 14, it is possible to guide the optical fiber 3a toward the fiber hole 14 by the inclined surface 15bA and 15bB.

Figure 4:
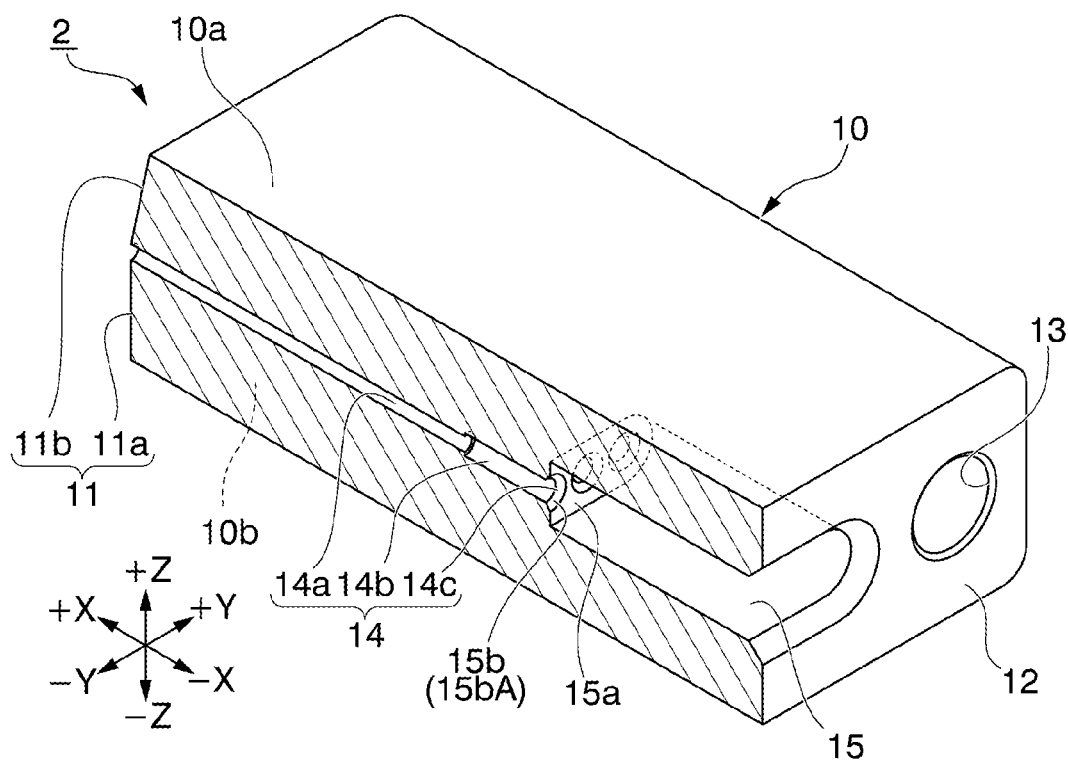
FIG. 4 is a partial cross-sectional view corresponding to FIG. 3, illustrating a ferrule for an optical connector according to a modified example.

A shape of the inclined surface 15b is not limited to that illustrated in FIGS. 2 and 3, and for example, a shape such as that illustrated in FIG. 4 may be employed. In the ferrule 2 illustrated in FIG. 4, the plurality of inclined surfaces 15b that are inclined toward the plurality of fiber holes 14 in a direction toward the front side are formed on the bottom surface 15a. Further, the plurality of inclined surfaces 15b include the first inclined surface 15bA. The plurality of inclined surfaces 15b are formed at the rear end portions 14c of the plurality of fiber holes 14. The inclined surfaces 15b each have a conical shape with an inner diameter decreasing in a direction toward the front side. According to such an inclined surface 15b, even if the optical fiber 3a is deviated in either the left-right direction Y or the vertical direction Z with respect to the fiber hole 14, it is possible to guide the optical fiber 3a toward the fiber hole 14 by the inclined surface 15b. If the fiber ribbon 3 is an intermittently bonded-type fiber ribbon, since a position of the optical fiber 3a in the left-right direction Y tends to be unstable, the inclined surface 15b may have a conical shape as illustrated in FIG. 4.

Also, the optical connector 1 of one or more embodiments includes the ferrule 2 described above, and the fiber ribbon 3 having the plurality of optical fibers 3a aligned in the left-right direction Y and bundled. The thickness Tc of the fiber ribbon 3 in the vertical direction Z and the dimension L of the internal space of the recessed portion 15 in the vertical direction Z may satisfy 1<L/Tc<2. According to this configuration, it is possible to align a position of the optical fiber 3a in the vertical direction Z with a position of the fiber hole 14 easily, and it is possible to provide the optical connector 1 whose assembling workability is satisfactory.

Further, the technical scope of the present invention is not limited to the above-described embodiments, and various modifications can be made without departing from the spirit of the present invention.

For example, it has been described in the above-described embodiments that the front end portion of the outer jacket 3b is inserted into the recessed portion 15. However, only a portion of the fiber ribbon 3 from which the outer jacket 3b has been removed may be inserted into the recessed portion 15.

In addition, the components in the above-described embodiments can be appropriately replaced with well-known components without departing from the spirit of the present invention, and furthermore, the above-described embodiments and modified examples may be appropriately combined.

For example, both the horizontally-long inclined surface 15b illustrated in FIG. 3 and the conical inclined surface 15b illustrated in FIG. 4 may be formed in the ferrule main body 10.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical connector
2 Ferrule
3 Fiber ribbon
3a Optical fiber
10 Ferrule main body
10a Upper surface
10b Lower surface
11 Connection end surface
12 Rear end surface
13 Guide hole
14 Fiber hole
14c Rear end portion
15 Recessed portion
15a Bottom surface
15b Inclined surface
15bA First inclined surface
15bB Second inclined surface
D Diameter
L Dimension
X Front-rear direction
Y Left-right direction
Z Vertical direction

What is claimed is:

1. A ferrule for an optical connector comprising:
a ferrule main body that comprises:
    fiber holes:
        that extend in a front-rear direction,
        that are disposed in a left-right direction, and
        into which optical fibers are inserted;
    a guide hole into which a guide pin is inserted; and
    a recessed portion recessed from a rear end surface of the ferrule main body toward a front side on which a connection end surface of the ferrule main body is disposed in the front-rear direction, wherein
a vertical direction is perpendicular to both the front-rear direction and the left-right direction, rear end portions of the fiber holes open at a bottom surface of the recessed portion,
the bottom surface comprises a first inclined surface inclined toward the fiber holes in a direction toward the front side,
D/Tf>0.4 where Tf is a thickness of the ferrule main body in the vertical direction and D is a diameter of the guide hole,
an upper surface and a lower surface of the ferrule main body are all covered with a wall surface, and
the first inclined surface extends flat in the left-right direction such that the first inclined surface overlaps a region in which the fiber holes are disposed in the left-right direction.

2. The ferrule according to claim 1, wherein
the bottom surface further comprises a second inclined surface inclined toward the fiber holes in a direction toward the front side,
the first inclined surface and the second inclined surface sandwich the fiber holes therebetween in the vertical direction, and
the second inclined surface extends in the left-right direction such that the second inclined surface overlaps the region.

3. The ferrule according to claim 1, wherein
the bottom surface comprises, at the rear end portions of the fiber holes, inclined surfaces that:
    are inclined toward the fiber holes in a direction toward the front side, and
    each have a conical shape with an inner diameter decreasing in a direction toward the front side.

4. An optical connector comprising:
the ferrule according to claim 1; and
a fiber ribbon comprising optical fibers aligned in the left-right direction and bundled, wherein 1<L/Tc<2 where Tc is a thickness of the fiber ribbon in the vertical direction and L is a dimension of an internal space of the recessed portion in the vertical direction.

* * * * *